United States Patent

[11] 3,627,188

[72] Inventor John E. Horne
Hyattsville, Md.
[21] Appl. No. 55,420
[22] Filed July 16, 1970
[45] Patented Dec. 14, 1971
[73] Assignee Rawdon Smith Associates, Inc.
Washington, D.C.

[54] DEVICE FOR EXTRACTING MAGNETIC TAPE FROM A CASSETTE
9 Claims, 5 Drawing Figs.

[52] U.S. Cl. .......... 226/200, 294/64
[51] Int. Cl. .......... B66c 1/02
[50] Field of Search .......... 226/200, 1, 89, 91; 294/64

[56] References Cited
UNITED STATES PATENTS

| | | | |
|---|---|---|---|
| 2,384,334 | 9/1945 | Olson | 294/64 |
| 2,919,696 | 1/1960 | Rinaldy | 294/64 X |

*Primary Examiner*—Richard A. Schacher
*Attorney*—William D. Stokes

ABSTRACT: A device for extracting tape from a cassette without disengagement from the spindles in the cassette, having suction means communicating with a relatively deep, elongated chamber which communicates with an open mouth of internal width closely approximating that of the tape to be extracted. The mouth of the device has front and sidewall parts extending from the chamber of outer dimensions which fit into the well of a magnetic tape cassette so that the tape to be extracted may be speedily and easily sucked into the elongated chamber in a loop gently, without damage by applying a relatively instantaneous suction.

INVENTOR
JOHN EDWARD HORNE

BY William D. Stokes
ATTORNEY

INVENTOR
JOHN EDWARD HORNE

BY William D. Stokes
ATTORNEY

DEVICE FOR EXTRACTING MAGNETIC TAPE FROM A CASSETTE

This invention relates to the art of magnetic tape recording and in particular relates to a tool for extracting a loop of magnetic tape from cassettes for the purpose of recording thereon or duplicating the recording thereon onto other cassettes.

In cassettes, the two ends of magnetic tape are permanently attached internally within the cassette housing. Heretofore, the duplication onto and from magnetic tape mounted into cassette-type cartridges was seriously limited by the structure of the cartridges. Recording on cassette tapes in the usual manner entails the use of a pressure pad (often felt or the like) built into the cassette at the opening under the exposed magnetic tape. As may be readily appreciated, the pressure of such pads against the tape and head will be uneven, and consequently, the head will wear unevenly. This uneven wear results in what is commonly known as "dropouts," since the tape is not able to follow the nonlinear contour of the recording head. In addition, small amounts of tape oxide accumulate on the pressure pad, digging pits in the sensitive recording head, causing poor reproduction.

Recently there has been invented an apparatus for high-speed duplication of cassette tapes which requires that a loop of tape be extracted from the cassette. The extracted loop is placed in contact with a drive capstan common to multiple recording or duplicating stations and thereby into contact with the respective recording heads without the necessity of pressure pads or the like. Utilizing the loop-out-of-cassette recording and duplicating technique, the obvious disadvantages of the prior methods discussed above are eliminated. The main problem encountered in using the loop-out technique has been in the extraction of a loop of tape from the cassette. It may be appreciated that the extraction of a loop of tape from the cassette must be done with extreme care in order not to damage the tape. Heretofore, there has been no device or method known which would enable one to speedily and gently extract a loop of tape from a cassette without potential damage to the tape or involving complicated techniques, either, or both of which, greatly add to the cost of recording and reproduction from cassettes. In accordance with this invention, a simple and practical device is provided which enables the extremely fast and gentle removal of a loop of tape from a cassette eliminating damaging contact with the tape.

It is therefore an object of this invention to provide a convenient and effective tool to speedily extract magnetic tape as a loop from cassettes.

It is another object of this invention to provide such a tool which eliminates scratches and other damage to the tape during extraction.

It is a more general object of this invention to provide such a simple, practical, and relatively inexpensive tool for extracting a loop of tape from a cassette for recording thereon or reproducing a recording previously thereon.

In accordance with this invention, a tool is designed which includes suction means communicating with a relatively elongated chamber which chamber has an open mouth away from the suction means. The mouth of the chamber has front and sidewall parts extending from the chamber to form lips of such size and shape that the outer dimensions will fit into the well of a magnetic tape cassette and the inner dimensions will just encompass the edges of the tape to be extracted so that when an instantaneous suction is applied within the chamber, a loop of tape will be speedily and gently sucked into the elongated chamber in the loop without damage. The tool is then removed from the loop and the loop easily placed in contact with the recording head and driving capstan.

For a better understanding of the invention, its objects and advantages, reference is now made to the following description of the embodiment illustrated in the accompanying drawings in which.

Figures 1, 2:
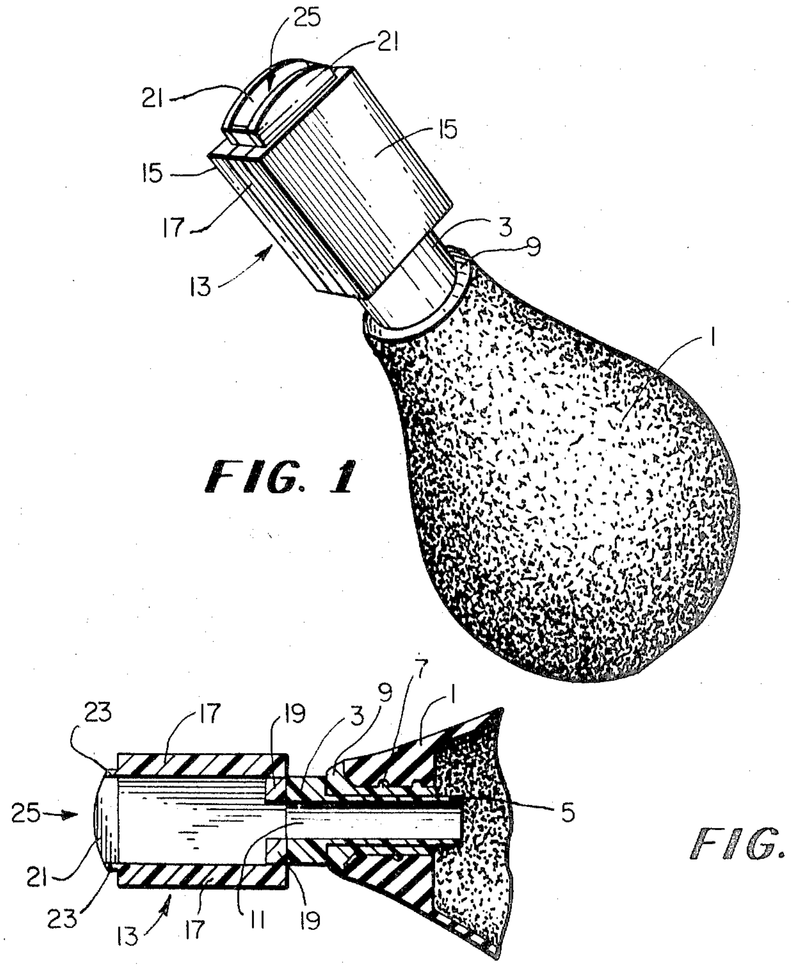
FIG. 1 is a perspective view of the tool of this invention.
FIG. 2 is a fragmentary midline section of the tool depicted in FIG. 1 taken parallel to the plane formed by the lips thereof.
Figure 3:
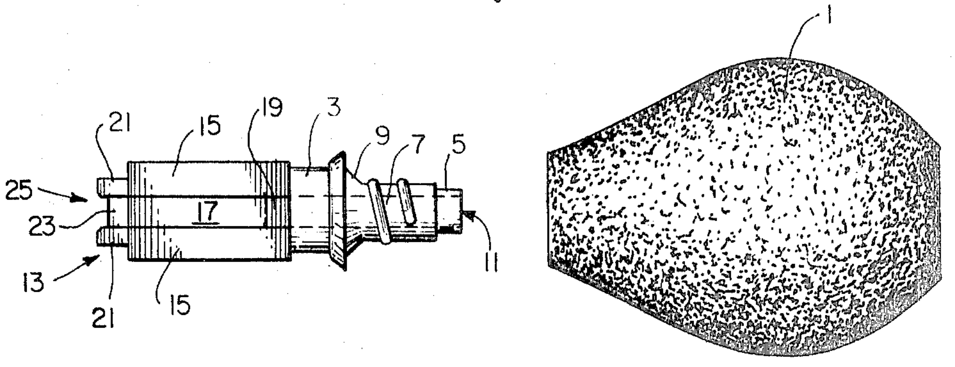
FIG. 3 is an exploded, external view of the tool taken 90° from the view of FIG. 2.

In the illustrated embodiment, the suction means for the inventive device is shown to be a resilient manually operated suction bulb. As shown in FIGS. 1 and 3, suction bulb 1 is of a generally ellipsoidal configuration, made of a resilient plastic or rubber and of a size easily held in the hand. Where a manually operated bulb is utilized as a suction means, the dimensions or capacity of such vary over a wide range. I have found satisfactory a bulb having a long dimension of about 2¼ inches and a diameter of about 1¾ inch.

Bulb 1 is tightly connected to a neck 3 which is integrally connected with chamber 13. The details of this connection are best illustrated in FIG. 2 and in FIG. 3, in which the two parts are shown separated. Bulb 1 is threaded internally at the end at which it is connected to neck 3. In the illustrated embodiment, neck 3 carries a reduced extension 5 continuous with suction conduit 11. In the preferred embodiment, suction conduit 11 is reduced in size from chamber 13 to ensure that the loop of tape is not sucked into the bulb. In other words, the loop being sucked into the chamber is actually stopped by a cushion of air formed by the forward motion of the tape pushing the air against the walls 19 of the chamber adjacent conduit opening 11. Suction neck 3 contains threads 7 which threadedly connect with opposed threads within the neck of bulb 1 permitting a tight connection when the tool is assembled. Integrally mounted on neck 3 is a flange 9 which extends outwardly from the neck to form a stop for bulb 1 when the bulb is operatively connected with the extraction tool.

In the illustrated embodiment, neck 3 is shown to be tightly bonded by cement to tape reception chamber 13. In the preferred embodiment, the two sides 15 of chamber 13 are formed of a rigid, strong, transparent material. It is to be understood, however, that the entire extraction portion of the tool, or any combination of parts thereof, may be molded as a single unit. While numerous materials fitting this description may be found satisfactory in constructing the tool of this invention, I have found that materials of acrylate polymers about three-sixteenth inch thick are economical and provide extremely satisfactory results.

The sides 15 of chamber 13 are connected together in a parallel, spaced relationship at opposite edges by strips 17 forming a generally rectangular chamber. At the end of chamber 13 where suction conduit 11 is located, blocks 19 are shown as forming the restricting walls of chamber 13 adjacent suction conduit opening 11. The blocks 19 extend just up to the sides of suction conduit opening 11. In the embodiment described herein, convenient dimensions of sides 15 are about seven-eighth inch in length and three-fourth inch in width.

Depending from sides 15 are lips 21, defining mouth 25, for insertion into the well of a cassette. In a preferred embodiment of the illustrated tool, lips 21 are about one-half inch in length and one-eighth inch in thickness. The inner walls of lips 21 are smoothly continuous with the inside walls of sides 15 where sides 15 define the chamber 13. Lips 21 are therefore parallel and spaced apart a distance closely approximating the width of a cassette held magnetic tape. In the usual case, this distance is approximately 0.150 inch. The outer edges of lips 21 are preferably rounded and beveled inwardly to prevent damage to the tape by accidental contact on insertion into the well of the cassette.

The strips 17 extend continuously as narrow, thin strips 23 connecting the outer edges of parallel lips 21. In the illustrated embodiment, all of the parts 21 and 23 are cemented at their points of contact. Excellent results are obtained in speedily and gently extracting a loop of tape from conventional cassettes with a tool having internal mouth dimensions of about fifteen thirty-seconds inch in length and 0.150 inch width.

Figure 4:
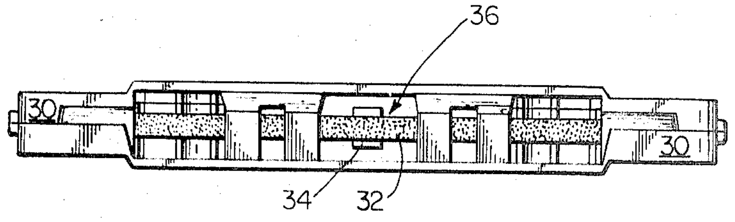
FIG. 4 is an end view of a conventional magnetic tape cassette.
Figure 5:
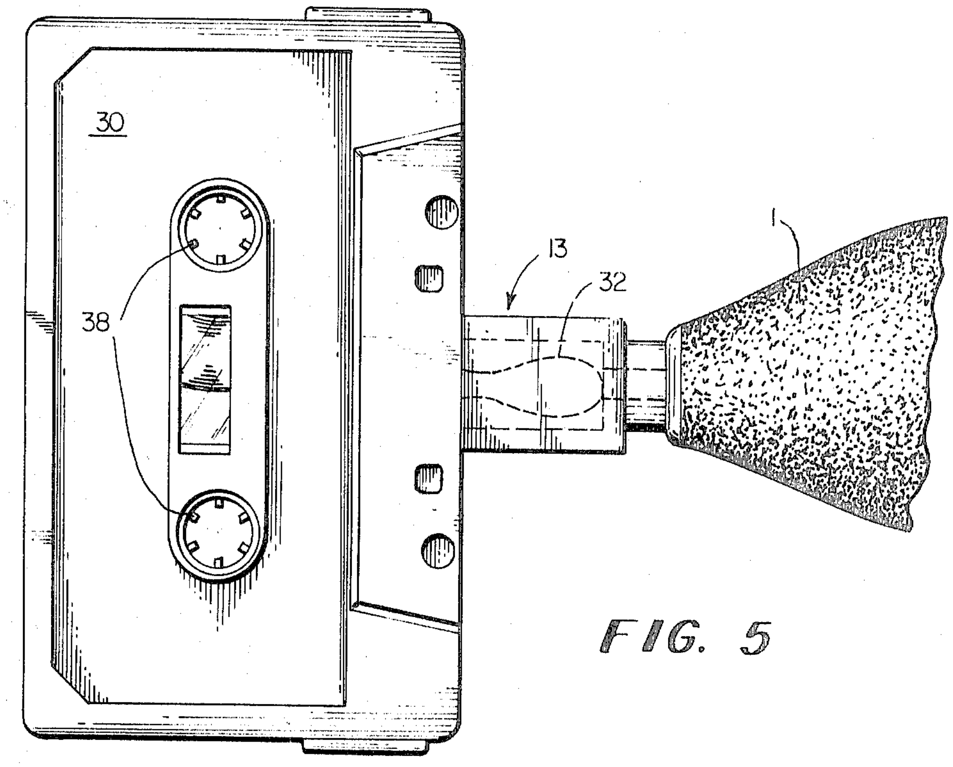
FIG. 5 illustrates the tool in operative relationship with a cassette.

A conventional tape cassette is illustrated in FIGS. 4 and 5. The cassette comprises a sealed housing 30 enclosing a quantity of magnetic tape 32 about 0.150 inch wide rotatingly and permanently mounted on reels (not shown) connected with sprockets 38.

In normal operation, tape 32 is driven across a pressure pad 34 which holds the tape against a reproduction head inserted at well 36. The tape 32 is moved by rotation of the sprockets 38 in the cassette, pad 34 producing a counter pressure on the reproduction head. Reproduction quality at the normal speed used is generally good. However, reproduction of a tape or duplication of a tape must be done at much higher speeds, otherwise reproduction would be extremely slow, hence costly. To record on, or duplicate a previously recorded tape, at much higher than normal speeds in a loop-out-type recorder-duplicator, extraction of a loop of tape 32 from the cassette is necessary. That loop is then positioned in the reproduction equipment where the tape is driven and recorded upon by special equipment which permits the high-speed operation.

The tool described is well suited for such extraction of the tape 32. As shown in FIG. 5, the mouth is inserted in well 36, where it just fits about the edges of the tape. Opening 25 is thereby positioned directly on tape 32, and the width of opening 25 just fits that of tape 32.

Bulb 1 is collapsed manually and then instantaneously released. The incoming air sucks up a loop of tape 32 well into chamber 13. The tool is then simply removed, leaving the loop of tape shown in FIG. 5 out where it can be easily positioned on the capstan and recording head mechanism (not shown). The beveled sides of walls 21 permit the tape 32 to enter chamber 13 with substantially no chance of damage to the tape. In the preferred embodiment, sidewalls 15 are transparent to enable the operator to see the loop formed.

It will be apparent that modifications of the preferred device can be developed and that the patent coverage therefore should not be unduly limited, but should be construed in accordance with law with particular reference to the accompanying claims.

What is claimed is:

1. A device for the extraction of a loop of magnetic tape from a cassette having a well through which said tape passes comprising
   suction means,
   an elongated chamber having an opening on one end of such dimension as to receive a loop of tape, said chamber being also connected with said suction means away from said loop receiving opening,
   extensions on said loop receiving opening for insertion into said well, said extensions defining an opening having a width substantially the same as said tape.

2. A device for the extraction of a loop of magnetic tape from a cassette having a well through which said tape passes
   a resilient, collapsible suction bulb,
   an elongated chamber having an opening of rectangular cross section, the short dimension of the cross section being of width substantially the same as said tape,
   a connecting part attached to said chamber, and connected to said bulb having a hole pneumatically connecting the interior of said bulb with said chamber, and
   a mouth for insertion into said well attached to said chamber opposite said connecting part, said mouth having a rectangular cross section of outside dimensions substantially the same as the dimensions of said well and having a rectangular opening of width substantially the same as said tape, the opening being positioned so as to fit around said tape when said extension is positioned in said well.

3. The device as in claim 2 in which said bulb is generally ellipsoidal.

4. The device as in claim 3 in which said chamber has at least one transparent side.

5. The device as in claim 4 in which said mouth is beveled on the long dimensions on the sides defining said opening.

6. A device for the manual extraction of a loop of magnetic tape of width of the order of magnitude of 0.150 inch from a cassette having a well through which said tape passes comprising
   a resilient, collapsible suction bulb adapted to be held and collapsed manually,
   a chamber having an opening at least one-half inch in depth, one-fourth inch in length, and of substantially the same width as said magnetic tape, said suction bulb being operatively connected with said chamber through a conduit of smaller cross-sectional dimensions than the interior cross section of said chamber,
   lips connected with said chamber forming a mouth for insertion into said well, said mouth having a rectangular cross section of outside dimensions substantially the same as the dimensions of said well and having an opening at least one-fourth inch in length and of the width substantially the same as said tape, the lips being positioned so as to fit closely adjacent to the edges of the tape in said well.

7. The device as in claim 6 in which said bulb is generally ellipsoidal.

8. The device as in claim 7 in which said chamber has at least one transparent side.

9. The device as in claim 8 in which said mouth is beveled on the long dimensions on the sides defining said opening.

* * * * *